Jan. 31, 1939.  A. J. WEATHERHEAD, JR  2,145,282
METHOD OF MAKING COUPLING NUTS
Filed Dec. 17, 1935
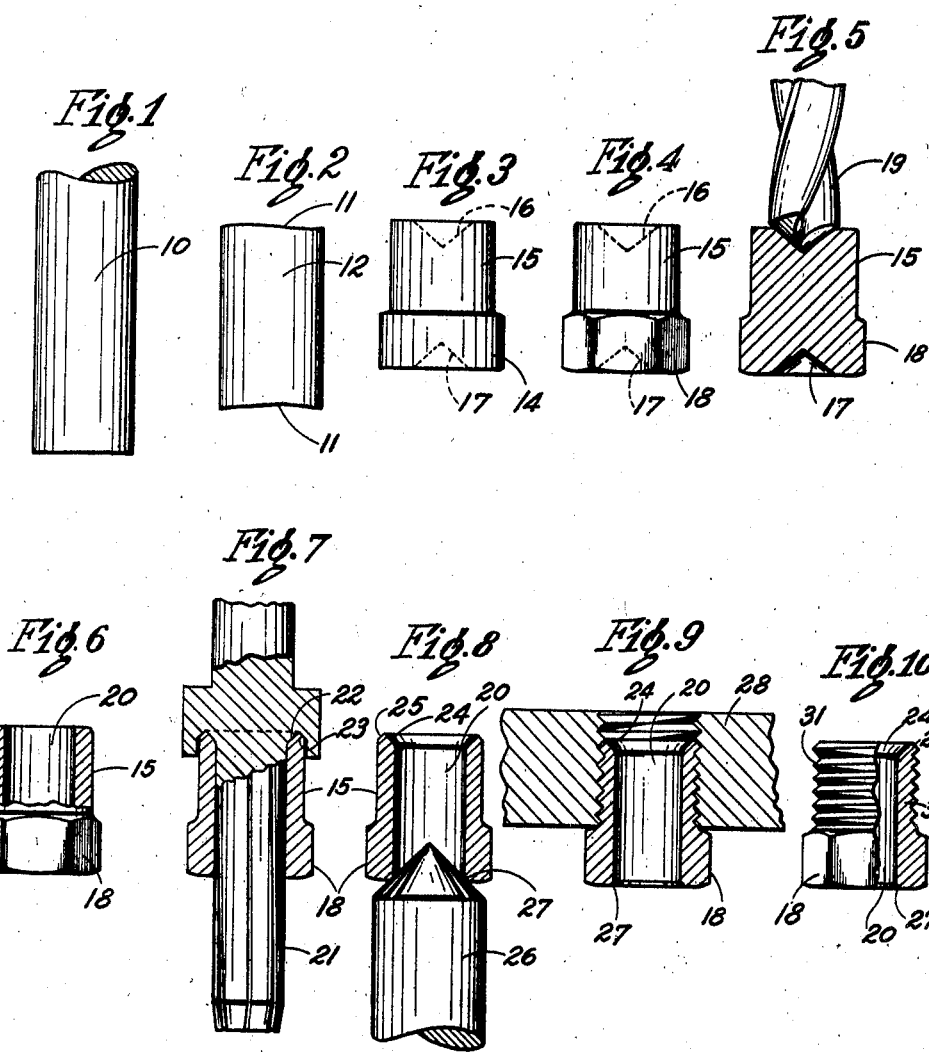
Inventor
ALBERT J. WEATHERHEAD, JR.
By Richey & Watts
Attorneys Patented Jan. 31, 1939

2,145,282

UNITED STATES PATENT OFFICE 2,145,282

METHOD OF MAKING COUPLING NUTS

Albert J. Weatherhead, Jr., Cleveland, Ohio, assignor to The Weatherhead Company, Cleveland, Ohio, a corporation of Ohio Application December 17, 1935, Serial No. 54,866

3 Claims. (Cl. 29—157)

This invention relates to methods of making pipe or tube couplings and similar articles, and more particularly to a method of making the coupling nuts or male members of pipe couplings of the type described in Patent No. 1,733,925, issued October 29, 1929 to Albert J. Weatherhead, Jr.

It is among the objects of my invention to provide a method whereby pipe couplings and similar articles can be made more rapidly and economically than by previous methods. Another object of my invention is to provide a method of making pipe couplings of high quality from inexpensive material such as rod or wire stock. Another object of my invention is to provide a method of making pipe couplings wherein the various steps of the method are correlated to insure accuracy in the finished product. Another object is to provide a method of making pipe couplings in which a superior grain structure of the metal is obtained by an upsetting or cold heading operation. Another object of my invention is to provide a method wherein machining operations are reduced to a minimum and wherein there is little waste of material. Another object is to provide an upset blank from which coupling nuts can be rapidly and economically produced. A further object is to provide a method of making such blanks.

Further objects and advantages of my invention will become apparent from the following description of a preferred form thereof, reference being made to the accompanying drawing, wherein Figures 1 to 10 inclusive illustrate various successive steps in my method, the raw material being shown in Figure 1 and the finished product being illustrated partially in section in Figure 10.

Previous methods of manufacturing such couplings have involved machining the couplings from hexagonal bar stock by automatic screw machine operations. Such methods have been very successful in the past, but in order to carry out the automatic screw machine operations rapidly it has been necessary carefully to control the quality of the steel employed, and the machining of the couplings from hexagonal bar stock involves a considerable waste of material. According to my present invention I produce the couplings from hot drawn rod or wire stock by upsetting a length of the wire to form a blank having the head and shank of the proper diameters, and thereafter carry out the machining operations necessary to produce the finished couplings. I am thus able to eliminate considerable waste of material, to reduce the amount of machining required and to employ very inexpensive material.

A section of the raw stock is illustrated at 10 in Figure 1. This preferably comprises a low carbon hot drawn steel rod or wire. The first operation is to shear off the wire or rod to the proper length, producing the piece illustrated in Figure 2 which ordinarily is of rather uneven shape, as shown, with irregular end surfaces 11.

The next step in my method is to produce the blank shown in Figure 3 by means of a cold heading or upsetting operation in which the piece of stock 12 is forced longitudinally into a die to form the enlarged cylindrical head portion 14 and accurately size the shank portion 15 resulting in a blank of the same length as the finished fitting. In this operation I also preferably form conical indentations 16 and 17 in the upper and lower ends of the blank. The formation of the indentation in the lower end of the blank assists in the upsetting operation in that the metal is displaced laterally so that the metal of the head 14 is caused to completely fill the die, while the indentation 16 in the upper end of the blank improves the character of the metal in this region, and this indentation is employed to guide a drill in the machining operations to be described below. Inasmuch as the indentation is formed in the upsetting operation it is centered accurately with respect to the cylindrical shank 15 of the blank. The formation of the indentations has a further advantage in that they reduce the amount of metal to be removed in the machining operations, and thus reduce the waste of material and increase the speed of machining.

The next step is to push the blank illustrated in Figure 3 through a hexagonal die to shear off the excess material in the enlarged cylindrical portion 14, thus producing the blank shown in Figure 4 having a hexagonal head 18, the cylindrical portion 15 and indentations 16 and 17.

The blank shown in Figure 4 is now in condition to be formed into a finished coupling by the series of machining operations illustrated in Figures 5 to 9, inclusive. Preferably the first operation is to drill an axial passageway through the blank. This may be carried out by means of a drill 19 of any ordinary design, which is illustrated in Figure 5 as just starting the drilling operation. It will be noted that the angle of the conical indentation 16 corresponds substantially with the angle of the point of the drill, so that the drill point is accurately centered with respect to the cylindrical surface 15, thus insuring that the drilled passageway 20 (see Figure 6) will be concentric with the cylindrical surface 15. In some instances, and particularly when the drilling and subsequent machining operations are to be carried out in a multiple spindle machine, it may be desirable to carry out the drilling operation in a number of different steps in order to equalize the time required by each step of the drilling operation with the time required by the subsequent machining operations. This scheme may be used advantageously to speed up production, for the formation of the axial passageway 20 requires more time than any of the subsequent machine operations.

After the passageway 20 is formed to bring the fitting to the stage illustrated in Figure 6, the bore of the passageway is reamed as shown in Figure 7 by a reamer 21 which is provided at its upper end with a forming tool having cutting surfaces 22 and 23 adapted to chamfer the inside and outside of the upper end of the blank as illustrated at 24 and 25, respectively, in Figure 8. It will be noted that these chamfers are formed in the region where the metal has received additional working by reason of the formation of the indentation 16. Apparently this additional working improves both the machinability and the strength characteristics of the metal in this zone.

The next step in the method is to form a slight chamfer, or perhaps more accurately, to remove the burr at the lower end of the passageway 20, by means of a conical reamer or deburring tool 26 which forms a slight chamfer as at 27. Under some circumstances, this step in my method may be omitted, particularly if the blank is formed as illustrated in Figure 3 with a conical recess 17 which has a larger diameter than the diameter of the drilled and reamed passageway 20.

The blank is now ready for the threading operation which may be carried out by any convenient die 28, as shown in Figure 9. This operation completes the coupling member and produces the finished coupling 30, illustrated in Figure 10, and having an axial bore 20, a hexagonal head 18, a threaded portion 31 terminating in the externally chamfered portion 25 and a conical seat 24 to engage the flared end of a metallic tube.

Ordinarily I prefer to carry out the steps illustrated in Figures 2, 3 and 4 in one machine and thereafter transfer the fittings to a multiple spindle machine to complete the machining and finishing of the fittings.

By reason of the fact that my fittings are made from round bar stock, the cost of material is reduced as compared with prior practices which required the use of hexagonal bar stock. The cold working obtained in the upsetting operations and forming the blanks improves the character of the metal, makes it possible for me to employ an extremely inexpensive material such as S. A. E. 1010 steel or low carbon rivet wire. By reason of the formation of the conical recess 16, the passageway 20 can be drilled through the fitting very accurately without the necessity of employing expensive jigs or fixtures to hold the work.

I preferably hold the blanks for the machining operations by merely resting the blanks in an indexing plate having hexagonal openings to receive and loosely engage the hexagonal heads 18. I find that the conical depression 16 accurately centers the drill point with respect to the work and results in drilling the passageway 20 concentric with the cylindrical surface 15. In the remaining machining operations the work is centered with respect to the tools either by the accurately drilled passageway 20, in the case of the reamer and forming tool and the deburring tool, or by the chamfered surface 25 and cylindrical surface 15 in the case of the die 28. Because of the fact that substantially no external machining is required in the production of fittings by my method, the waste of material is reduced as compared to prior methods of manufacturing similar articles.

In the foregoing specification I have described my method particularly as applied to the manufacture of one type of fitting or coupling nut. It will be evident that my method can be applied to the manufacture of other types of couplings and fittings without departing from the spirit or scope of my invention. It is therefore to be understood that my patent is not limited by the foregoing description of a preferred form thereof or in any other manner other than by the scope of the appended claims when given the range of equivalents to which my patent may be entitled.

I claim:

1. A method of making coupling nuts or fittings including the steps of shearing round stock to the proper length to form a blank, upsetting the sheared length of stock to form a blank having a cylindrical shank portion and a cylindrical head portion and having a conical recess in one end face of the blank, said recess being formed during the upsetting operation and being concentric with the cylindrical surface of said shank, shearing off the enlarged cylindrical head portion to form a hexagonal head portion, holding the blank by said hexagonal head portion and drilling a longitudinal passageway through the blank, the point of the drill being centered by said conical recess, reaming said axial passageway and simultaneously chamfering the inside and outside end surfaces of the cylindrical shank portion, chamfering the end of the passageway adjacent the hexagonal head portion and threading the exterior of said cylindrical shank portion.

2. A method of making coupling nuts or fittings including the steps of shearing round wire stock to the proper length to form a blank, upsetting the sheared length of stock to form a blank having a cylindrical shank portion and an enlarged cylindrical head portion and having conical recesses in the end faces of the blank, said recesses being formed during the upsetting operation and being concentric with the cylindrical surface of said shank, shearing off the enlarged cylindrical head portion to form a hexagonal head portion, holding the blank by its hexagonal head portion and drilling a longitudinal passageway therethrough, the point of the drill being formed with an angle substantially equal to the angle of said conical recesses and being centered by one of said conical recesses, reaming said axial passageway, chamfering the inside and outside end surfaces of the cylindrical shank portion, chamfering the end of the passageway adjacent the hexagonal head portion and threading the exterior of said cylindrical shank portion.

3. A method of making coupling members or fittings including the steps of shearing round stock to the proper length to form a blank, upsetting the sheared length of stock to form a blank having a cylindrical shank portion, an enlarged cylindrical portion and a conical recess in the end face of said cylindrical shank portion, said recess being formed during the upsetting operation and being concentric with the cylindrical surface of said shank portion, shearing the enlarged cylindrical portion to form a flat surface thereon, holding the blank against rotation by means engaging said flat surface while drilling a longitudinal passageway in said shank portion and concentric therewith by means of a rotating drill having a conical point, the angle of the drill point being substantially equal to the angle of said conical recess whereby said drill point is accurately centered with respect to the cylindrical surface of said shank portion.

ALBERT J. WEATHERHEAD, Jr.